United States Patent
Fattohi

(10) Patent No.: US 7,154,251 B2
(45) Date of Patent: Dec. 26, 2006

(54) DUAL CONTROLLED OUTPUT VOLTAGE, ANTI-SATURATION, AUTO-TRANSFORMER CIRCUIT METHODOLOGY

(76) Inventor: Samir Fattohi, 7 Tanager La., Robbinsville, NJ (US) 08691

( * ) Notice: Subject to any disclaimer, the term of this patent is extended or adjusted under 35 U.S.C. 154(b) by 0 days.

(21) Appl. No.: 10/853,736

(22) Filed: May 25, 2004

(65) Prior Publication Data
US 2005/0264269 A1    Dec. 1, 2005

(51) Int. Cl.
*G05F 1/147*    (2006.01)
(52) U.S. Cl. .................................... 323/256
(58) Field of Classification Search .............. 323/255, 323/256, 257
See application file for complete search history.

(56) References Cited
U.S. PATENT DOCUMENTS
3,889,152 A * 6/1975 Bodine et al. ............. 315/205

* cited by examiner

*Primary Examiner*—Shawn Riley
(74) *Attorney, Agent, or Firm*—National IP Rights Center

(57) ABSTRACT

An apparatus for selectively stepping up/down the voltage applied from an input to any load in an alternating current power system. The apparatus includes an auto transformer having a series winding with a plurality taps for the selection of different output load voltages and a common winding. The series winding being connected between said input of the alternating current power system and said common winding. The common winding being connected between the series winding and common or neutral terminal of an alternating current power system. The load is being connected between one tap of the series winding and the common or neutral terminal of the alternating current power system. A pair of switching or solid state switching devices, the first switching device being connected between the autotransformer common winding and the common or neutral terminal of an alternating current power system, and one terminal of the second switching device is connected between the auto transformer series and common winding and the second terminal of the switching device is connected between the auto transformer common winding and the first switching device. The paid of switching or solid state switching devices being configured for disconnecting said common winding of the auto transformer from the common or neutral terminal of an alternating current power system and shorting the common winding in a first position and opening the shorted common winding and connected said auto transformer common winding to the common or neutral terminal of an alternating current power system in a second position.

15 Claims, 5 Drawing Sheets

DUAL CONTROLLED OUTPUT VOLTAGE, ANTI-SATURATION, AUTO-TRANSFORMER CIRCUIT METHODOLOGY

FIELD OF THE INVENTION

The present invention is directed to the field of controlling the output voltage applied to a general load including but not limited to adjustable load voltage or conserving power. More specifically, to a standard circuit design of an autotransformer apparatus for step up/down the output voltage applied to a general load including but not limited to a bank of Fluorescent lights and High Intensity Discharge (HID) lamps to overcome implementation problems of related art, voltage reduction apparatus.

BACKGROUND OF THE INVENTION

Related Art—Part I

The present invention constitutes a substantial improvement over related art U.S. Pat. No. 2,429,162, issued Oct. 14, 1947. That patent discloses a number of alternative transformer configurations utilizing a variety of switches and relays. These configurations permit the application of a nominal voltage of Fluorescent lamps followed by a reduction in that voltage subsequent to lamp lighting in order to maintain the lamps in a lighted condition at reduced power consumption.

The related art concepts which utilize an autotransformer and a switching means for either selectively applying one or more taps of the autotransformer to the load or shorting portions of the autotransformer for controlling the voltage applied to the load, do indeed serve the aforementioned purpose of reducing power consumption in a lighting load but unfortunately suffer from a number of disadvantages which the present invention is designed to overcome. By way of example, in such related art disclosure, the switch unit that is used to control the voltage applied to the load, is normally interposed between the input power and the load. As a result, it must be capable of supporting the entire load current on either the input or output terminals of the autotransformer. Accordingly, to withstand such high carrying current requirements, such switching devices must be large and bulky and are commensurately expensive. The high cost of such units tends to defeat the cost saving aspect of power consumption reduction.

A number of other patents that disclose the use of relay-controlled autotransformer, which constitutes a substantial improvement over related art, by way of example U.S. Pat. No. 4,431,948, issued Feb. 14, 1984. This patent disclose a selective reduction of voltage applied to a load, such as a lighting load for purposes of reducing power consumption by utilizing an apparatus in which an autotransformer is connected in series relationship with a switching device, such as a relay. A portion of the autotransformer winding is interposed between the input and the output and an additional portion of the autotransformer winding is interposed between the output and the common or neutral terminal of an alternating current power system.

The winding interposed between the input and the output is referred to therein as the series winding of the autotransformer and the portion of the winding interposed between the output and the common or neutral terminal of an alternating current power system is referred to as therein as the common winding of the autotransformer. A relay or equivalent switching device is connected between the series and the common autotransformer winding so that when the relay or equivalent switching device is in its open configuration, no current can flow in the common winding and the output voltage is substantially equivalent to the input voltage, less any normal voltage drop across the relatively low impedance of the series winding. On the other hand, when the relay or equivalent switching device is closed, the current is permitted to flow in the common and series winding and the autotransformer performs its normal function with the output voltage changed relative to the input voltage in proportion to the ratio of the turns of the two windings of the autotransformer. A significant advantage of that related art patent was the disclosure of a relay or an equivalent switching device that was not in the direct path of the load current or either side of the transformer, thus allowing the use of a relay or equivalent device, which need only handle a fraction of the actual load current. As a result, it was possible to use a relay or switching device, which is smaller and far less expensive than devices of the related art are designed to perform similar functions for changing voltage to a load, such as a bank of lights.

However, subsequent to the issuance of the aforementioned patent, it was discovered that the disclosed circuit also suffers a significant disadvantage occurred during nominal voltage application when the relay or equivalent switching device was in its open configuration, thus disconnecting the common winding from the series winding of the autotransformer. More specifically, it was found that in the nominal voltage mode, the current in the series winding produced a significant magnetic fielding, which induced magnetic flux saturation in the magnetic steel core of the autotransformer, which caused several problems.

One of the problems was that the magnetic field in the core caused the common winding to produce a substantial value of voltage between one terminal of the common winding and the common or neutral terminal of the alternating current of the power system, because the common winding is disconnected electrically from the series winding. Another problem is associated with the magnetic flux saturation of the magnetic steel core was the induced high frequency harmonic distortion in the series winding which effectively reduced the amplitude of the voltage available from the series winding during the nominal voltage configuration. The reduction of the voltage amplitude was significant, in fact significant enough to, in some cases, make it difficult or impossible to turn Fluorescent or other arc type light systems "ON" during the nominal voltage start-up mode. Another problem associated with the saturation of the magnetic steel core of the autotransformer was that the magnet steel was heated so significantly that the iron and copper looses were increased beyond acceptable level, especially in case of mal-function of the apparatus, which would lead to damage of the autotransformer magnet wire insulation, therefore as a consequence, destroy the autotransformer winding.

Thus, although the advantages described in the aforementioned related art patent are significant, the then unforeseen disadvantages make it difficult if not impossible to exploit that novel power consumption reduction configuration by making it impractical to actually implement.

Related Art—Part II

The present invention constitutes a substantial improvement over related art U.S. Pat. No. 5,508,589, issued Apr. 16, 1996; U.S. Pat. No. 5,528,110, issued Jun. 18, 1996 and U.S. Pat. No. 5,623,186, issued Apr. 22, 1997. These patents discloses a selective reduction of voltage applied to a load, such as a Fluorescent lights and High Intensity Discharge lamps (HID). The purposes of this is to reduce power consumption by utilizing an apparatus in which an autotransformer is provided with an additional winding, namely a bucking coil winding which wound in bifilar, opposite relation with the common winding of the autotransformer. This bifilar bucking coil winding is, because of its opposing direction of winding, designed to cancel out all of the ill effects described earlier with respect to the unitary common winding of the related art patent.

This configuration consists of two relays; portions of a unitary, double pole, and double throw switches. One relay pole is switched to either connect or disconnect the series winding and the common winding depending upon whether one is operating in a full voltage mode or reduced voltage mode. The second relay is provided to either connect the load end of the common winding, to the common or neutral of the alternating current power system, or to one end of the bucking winding.

When the first relay is connecting the series with the common winding, which is essentially equivalent to the before mentioned related art part I, which constitute the reduced voltage mode, the second relay is connecting the common winding to the common or neutral of the alternating current power system. The bucking winding is completely disconnected from the circuit and provides no function whatsoever. The current is permitted to flow in the common and series winding and the autotransformer performs its normal operation with the output voltage changed relative to the input voltage in proportion to the ratio of turns of the two windings of the autotransformer.

In the nominal voltage mode the two relays are connecting the common and the bucking winding in parallel, where a substantial value of current is flowing in the parallel winding. The output voltage is substantially equivalent to the input voltage, less any normal voltage drop across the relatively low impedance of the series winding.

However, subsequent to the issuance of the aforementioned patent related art part II, it was discovered that the disclosed circuit also suffers a significant disadvantage. This disadvantage occurred during nominal or high voltage operation when both relays were in there open configuration to the series winding and neutral terminal of an alternating current power system, thus connecting the common winding and the bucking winding of the autotransformer in parallel.

Thus, although the advantages described in the aforementioned related art patent are significant, the then unforeseen disadvantages make it difficult if not impossible to exploit that novel power consumption reduction configuration by making it impractical to actually implement, this disadvantage caused through the disconnect and connect the relays to switch the apparatus from the high voltage mode to the reduced voltage mode and vice versa.

This is a significant disadvantage. The common winding and bucking winding have the same number of turns wound on the core of the autotransformer, but the bucking winding is wound in bifilar relation to the common winding. The load current which flows in the series winding produces a magnetic flux in the autotransformer core, which induces a voltage of the same value, in the common winding and bucking winding but of opposite polarity. In other words they are 180° out of phase, so that the potential difference between two points of contact of each relay would have a double voltage value. The energy value would be quadrupled as the relationship varies based on the square of the double value. In the course of switching (high, low) the relays, the points of contact suffer sever damage due to the high-generated energy, which has to be vanished. The vanished energy is transferred to heat, which leads to a high arc between the relay points of contact, causing sever damage or welding the relay contacts together. This disclosed related art circuit suffers a significant malfunction, which leads to continuous interruptions in operation and consequently expensive maintenance cost.

Further significant disadvantage of the related art, is that the autotransformer circuit is no longer of a standard circuit design. This is because the autotransformer utilizes an additional bucking winding, with the same number of turns wound bifilar to the common autotransformer winding. This leads to more expensive apparatus, due to the increased in manufacturing cost, using more materials, larger size and a heavier autotransformer.

There is therefore a need to provide an improved circuit design for control, and low power consumption, which permits the realization of the advantages of the aforementioned disclosures. This circuit design provide a significant reduction in the current carrying capacity required for the relay or other equivalent switching device. Additionally, this circuit avoids the harmonic distortion and inadvertent heating effects caused by the high magnetic fields generated through the flowing current in the series winding during the full voltage mode of that circuit.

SUMMARY OF THE INVENTION

The present invention meets the aforementioned need by providing an improved apparatus for control of load power consumption which exploits the advantageous characteristics of the circuits described in the related art U.S. Pat. No. 2,429,162, issued Oct. 14, 1947, U.S. Pat. No. 4,431,984, issued Feb. 14, 1984; U.S. Pat. No. 5,508,589, issued Apr. 16, 1996; U.S. Pat. No. 5,528,110, issued Jun. 18, 1996 and U.S. Pat. No. 5,623,186, issued Apr. 22, 1997 but which provides a remedy for the problems associated with the disadvantages described herein above. More specifically, although the circuit configuration of the present invention is substantially the same as that disclosed in the aforementioned related art patents, in the preferred embodiment disclosed herein, the autotransformer contains of a series and common coil wound in the same relation and assembled on a magnetic steel core. This common coil winding of the autotransformer is shorted to oppose completely the magnetic field in the autotransformer core during the nominal voltage mode. Consequently, despite the continuing high magnetic field and high frequency generated by the series winding of the autotransformer in the nominal voltage mode, any harmonics generated in the series winding are in effect, through shorting the common winding, compensated by the equal and opposite induced magnetic field in the common winding. In fact, any high frequency magnetic field generated through the series winding in the nominal voltage mode operation of the circuits by the load current flow through the series winding, are exactly compensated by the equal and opposite effects generated through the shorting of the common winding.

As a result, no high frequency field is generated in the series winding, which consequently generate absolutely no excessive amount of harmonics in the load current flowing in the series winding, which leads to over heating the autotransformer magnetic steel core and increases the copper and iron losses. The harmonics distortion of the voltage sine wave magnitude is eliminated to the point where the controlled voltage or virtually high voltage can be achieved in the nominal voltage mode, thus enabling the necessary high voltage to any load, way of example such as to initiate the arc start of the Fluorescent lights or High Intensity Discharge lamps (HID) after initial turn on of the lamp fixture lights and other such lighting which especially conductive for use with the present invention. It will also be seen hereinafter that the implemented relays of the related art patent is replaced in the present invention by a pair of contactors or equivalent switching devices, where can be interlocked mechanically and electrically.

These contactors serve the same function as the relays of the related art patent, namely to interconnect or disconnect the common winding from the series winding and the common or neutral terminal of an alternating current power system, depending on the mode of operation of the apparatus, namely shorting the common winding when it is desired to provide a nominal voltage mode for start-up Fluorescent lights and/or High Intensity Discharge lamps (HID), for example opening the shorted common autotransformer winding and connecting the common winding to the common or neutral terminal of an alternating current power system, the autotransformer performs its normal operation with the output voltage stepped up/down relative to the input nominal voltage in proportion to the ratio of number of turns of the winding of the autotransformer, when it is desired to provide a stepped up/down voltage to the connected loads.

However, in the configuration in which the common winding is disconnected from the common or neutral terminal of an alternating current power system, the aforementioned contactors of the present invention short the common winding at each end, while simultaneously disconnecting the common winding from the common or neutral terminal of an alternating current power system. Although this is a simple solution with no additional parallel winding wound in bifilar to the common autotransformer winding the aforementioned problems, it is also an elegant one, which essentially overcomes the disadvantage of the related art patent disclosure and enables one to achieve the important advantages described herein.

OBJECTS OF THE INVENTION

More specifically the present invention is a standard autotransformer circuit design, and also provides highly advantageous apparatus for supplying two different voltage values to a load without generating harmonic distortion and reduced voltage magnitude. This is accomplished after first providing a full magnitude of the nominal input voltage thereto, by the use of an autotransformer having a series winding and a common winding, connectable and disconnect able to one another by means of contactors or other equivalent mechanical or solid state switching devices. In addition, the improved apparatus of the present invention provides contactors or equivalent switching devices, which are mechanically and electrically interlocked to prevent the contactors or equivalent switching devices from operating simultaneously due to a malfunction of the control circuit.

The present invention pertains generally to an apparatus for controlling the output voltage applied to a general load including, but not limited to, adjustable voltage or conserving power. More specifically, the present invention pertains to a standard circuit design of an autotransformer apparatus for advantageously stepping up/down the output voltage applied to a general load such as a bank of lamps including, but not limited to, Fluorescent lights and High Intensity Discharge lamps (HID) after initial turn on of the lamp fixture.

It is therefore a principle object of the present invention to provide an improved voltage control apparatus for step up/down power consumption in any loads, way of example such as a bank of fluorescent lights and High Intensity Discharge Lamps and which obviates the disadvantageous of the Part I related art problems of harmonic distortion and the Part II related art problem of opposite induced EMF in the parallel winding of the autotransformer in the nominal voltage output mode.

The present invention is designed to overcome the problem of magnetic field flux induced harmonic distortion and magnetic core heating associated with the related art, which otherwise substantially detracted from the advantageous implementation thereof.

The main significant disadvantage of the Part I related art occurred during nominal voltage mode, in which the magnetic steel core of an autotransformer utilized in the invention is saturated by the induced high frequency magnetic field, therefore leading to core saturation and therefore to heating of the autotransformer core, because of the disconnected common winding from the autotransformer circuit.

The main significant disadvantage of the Part II related art occurred during the relays switching operation from nominal voltage mode to reduced voltage mode and vice-versa. The relays point of contact carry a doubled value of the induced voltage, caused through the bucking coil winding which wound in bifilar to the common autotransformer winding, so that the induced voltage in both winding have 180° out of phase relation and therefore peak to peak voltage of doubled value, so that the energy amount has to be vanish, where transferred to heat, would be quadruple as the relation ship varies based on the square of the double quantity.

It is still a further object of the present invention to provide an improved voltage control apparatus for step up/down power consumption in bank of loads including, but not limited to, Fluorescent lights and High Intensity Discharge Lamps by selectively switching from a nominal voltage mode to a step up/down voltage mode, implemented by an autotransformer having a series and common winding configuration to prevent the disadvantageous problem of the Part I related art inadvertent and detrimental saturation of the autotransformer core effects and also obviates the disadvantageous problem of the Part II related art of opposite induced EMF in the parallel common winding of the autotransformer and the switching difficulties associated with the connect and disconnect of the common winding from the series winding.

BRIEF DESCRIPTION OF DRAWINGS

The aforementioned objects and advantages of the present invention, as well as additional objects and advantages thereof, will be more fully understood hereinafter as the results of a detailed description of a preferred embodiment when taken in conjunction with the accompanying drawings in which.

DETAILED DESCRIPTION OF A PREFERRED EMBODIMENT

By way of a background and for a more full understanding of the improvement provided by the present invention, reference will be made first to FIG. 1, part I related art, and FIG. 2, part II related art, which illustrates the underlying invention to which the improvement hereof is directed.

Figure 1:
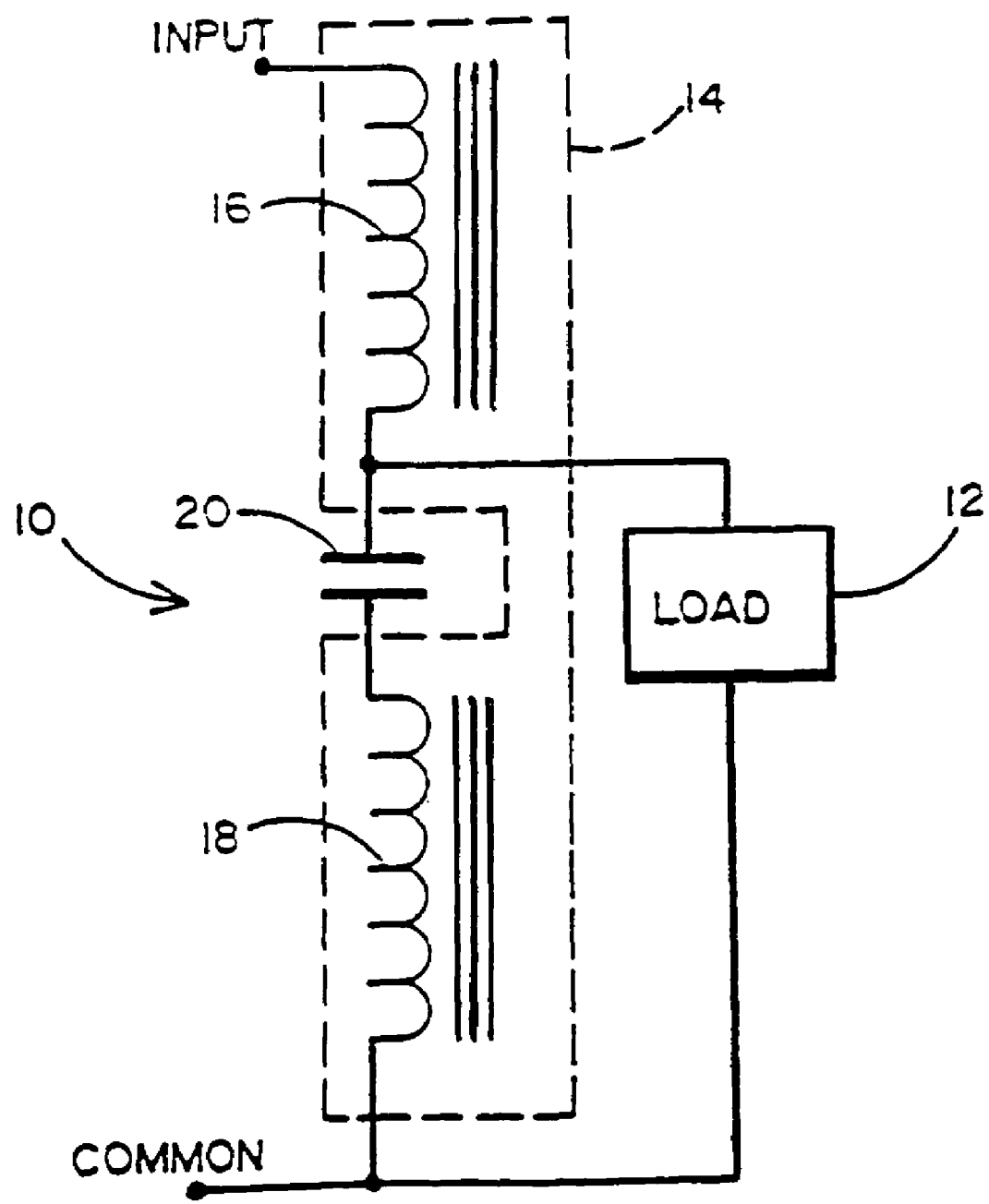
FIG. 1 is a schematic illustration of the related art part 1 autotransformer-implemented apparatus of U.S. Pat. No. 4,431,948, issued Feb. 14, 1984, that will be described herein by way of background and to which the improvement of the present invention is directed; shown configured in its high voltage mode.

As shown therein in FIG. 1, a voltage reduction apparatus 10 of the part I related art is shown connected to a load 12, in order to deliver alternating current power to a load, which in the configuration illustrated, is delivered between an input line and a common or neutral terminal of an alternating current power system. The apparatus 10 for reducing power comprises an autotransformer 14 which includes a series winding 16 and a common winding 18 and between which there is serially connected a relay 20 or other equivalent device.

The series winding 16 is connected to the input of the alternating current power source at one end thereof and the other end of the series winding is connected to the load 12. The common winding 18 and the relay or equivalent switching devices 20 are connected across the load between the series winding and the common or neutral of an alternating current power system. When the relay is open, substantially full input voltage is applied to the load with a slight drop in voltage resulting from the impedance of the series winding 16 of the autotransformer 54. The drop is very small and does not substantially affect the input voltage of the load. When it is desired to reduce the voltage to the load, the relay 20 is closed, which permits current to flow in the common winding 18 and thus reduces the voltage to the load, based upon the voltage dividing effect of the retrospective winding 16 and 18.

The significant advantage of this related art circuit for reducing voltage to a load is that the relay 20 or equivalent switch is not in the direct flow of load current and can be therefore of low current rating and smaller size and cost as compared to earlier related art U.S. Pat. No. 2,429,162, issued Oct. 14, 1947. Although the related art circuit of FIG. 1 is feasible for reducing power consumption to a load in a variety of applications, one of its principle is to be used in conjunction with the bank of arc type lights, such as Fluorescent lights and High Intensity Discharge Lamps which need a higher voltage to provide an adequate starting current, but can then be operated at substantially lower voltage without any significant reduction in light generation. Consequently, the circuit of FIG. 1 provides a significant advantage from a cost saving standpoint, both in the reduction of load consumption, such as in a bank of Fluorescent lights and High Intensity Discharge Lamps, as well as in the current rating of the relay or equivalent switching device 20.

Unfortunately as previously indicated, the part I related art circuit of FIG. 1 in its full voltage mode, which occurs when relay 20 is open, produced a significant disadvantage, resulting from generation of large number of high frequency magnetic field in the magnetic steel core of the autotransformer 14, which results in generating heat in the autotransformer core 14, caused by the flow of the load current in the series winding 16, when the common winding 18 was electrically disconnected from the circuit. Electrically, the autotransformer circuit is operating as a two-windings transformer with reduced number of turns in the primary or series winding 16, wound on the core connected in series with the load 12 with open secondary winding 18.

This disadvantage, as previously described, relates to the problem of generating high frequency harmonics in the load current flowing through the series winding 16, which significantly distorts the sine wave there-through and effectively reduces the output voltage value thereby making it difficult or impossible to turn lights system on during the high voltage start up mode.

Figure 2:
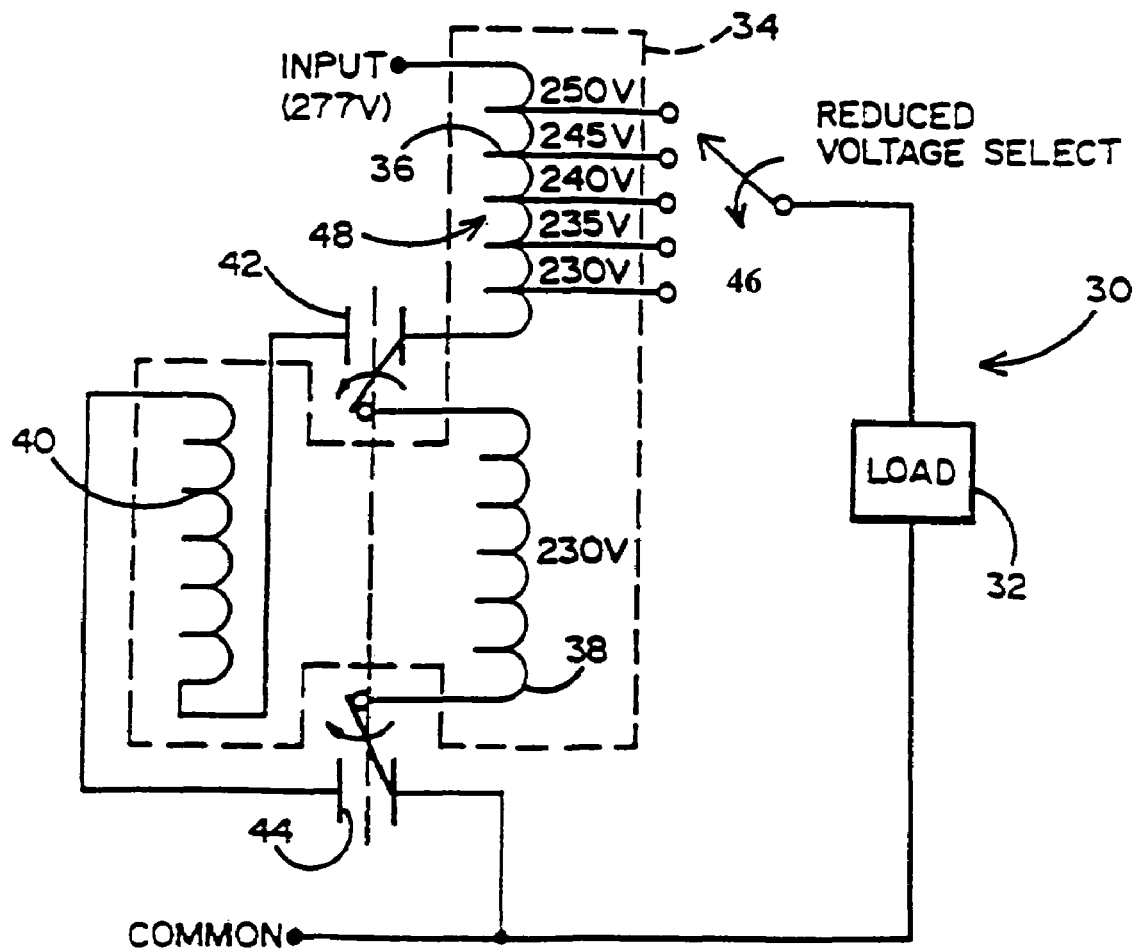
FIG. 2 is a schematic illustration of the related art part II autotransformer implemented apparatus of U.S. Pat. No. 5,508,589, issued Apr. 16, 1996; U.S. Pat. No. 5,528,110, issued Jun. 18, 1996 and U.S. Pat. No. 5,623,186, issued Apr. 22, 1997.

As shown therein in FIG. 2, a voltage reduction apparatus 30 of the part II related art is shown connected to a load 32, in order to deliver alternating current voltage thereto between an input and common or neutral of an alternating current power system in a manner similar to that of FIG. 1. Also similar to FIG. 1 the apparatus 30 contains of a series winding 36 and a common winding 38. Also provided therein is a relay 42, which is switched to either connect or disconnect the series winding 36 and the common winding 38. However, unlike the circuit in FIG. 1 this apparatus 30 employs a bucking coil winding 40, which is wound in bifilar and opposed relation to the common winding 38. Furthermore, unlike the part I related art circuit of FIG. 1 this apparatus 30 employs a second relay 44 which is provided to either connect the load end of the common winding 38 to common or neutral of an alternating current power system or to one end of the bucking coil winding 40.

The aspect of this circuit is the bucking coil winding 40. When the apparatus 30 configured in a reduced voltage mode, the relays 42 and 44 are configured to connect the series winding 36 to the common winding 38, which is essentially equivalent to the circuit of FIG. 1, part I related art, when relay 20 therein is closed. In this reduced voltage configuration, the bucking coil winding 40 is completely disconnected from the circuit and provide no function whatsoever. However, when the apparatus 30 is operating in the high or nominal voltage mode the relays 42 and 44 is connecting the common winding 38 in parallel configuration to the bucking winding 40. The parallel combination of common winding 38 and bucking winding 40 are electrically disconnected from the series winding 36 and the load 32. The flowing current in the parallel configuration of common winding 38 and bucking winding 40 together with the number of turns of both windings produces a demagnetizing magnetic flux that is proportional to the flowing current times the number of turns and which opposes the main magnetic flux produced by the flowing load current in the series winding 36.

Unfortunately as previously indicated, the related art circuit of FIG. 2, which occurs when the relays 42 and 44 switching operation from high or nominal voltage mode to reduced voltage mode and vice verse, produce a significant disadvantage. The common winding 38 and bucking winding 40 have the same number of turns wound on the core of the autotransformer, but the bucking winding 40 is wound in bifilar relation to the common winding 38. The load current flows in the series winding 36 produces a magnetic flux in the autotransformer core, which induces a voltage of the same value in the common winding 38 and bucking winding 40 but of opposite polarity, in other words, they are 180° out of phase relation, so that the potential difference between two points of contact of each relay would have the double voltage value. The energy value would be quadruple as the relationship varies based on the square of the double quantity. In the course of connecting and disconnecting the relays, point of contacts suffer sever damage due to the high-generated energy, which has to be vanish. The vanished energy is transferred to heat, which leads to a high arc between the relay contacts, causing sever damage or welding the relay point of contacts together. This disclosed circuit suffers a significant malfunction, which leads to a continuously operation interruption and expensive maintenance problem.

Further significant disadvantage of the related art the autotransformer is no longer standard circuit design, because the autotransformer utilize an additional winding with the same number of turns wound bifilar to the common autotransformer winding, this leads to more manufacturing cost, more materials, larger size and heavier autotransformer.

Figure 3:
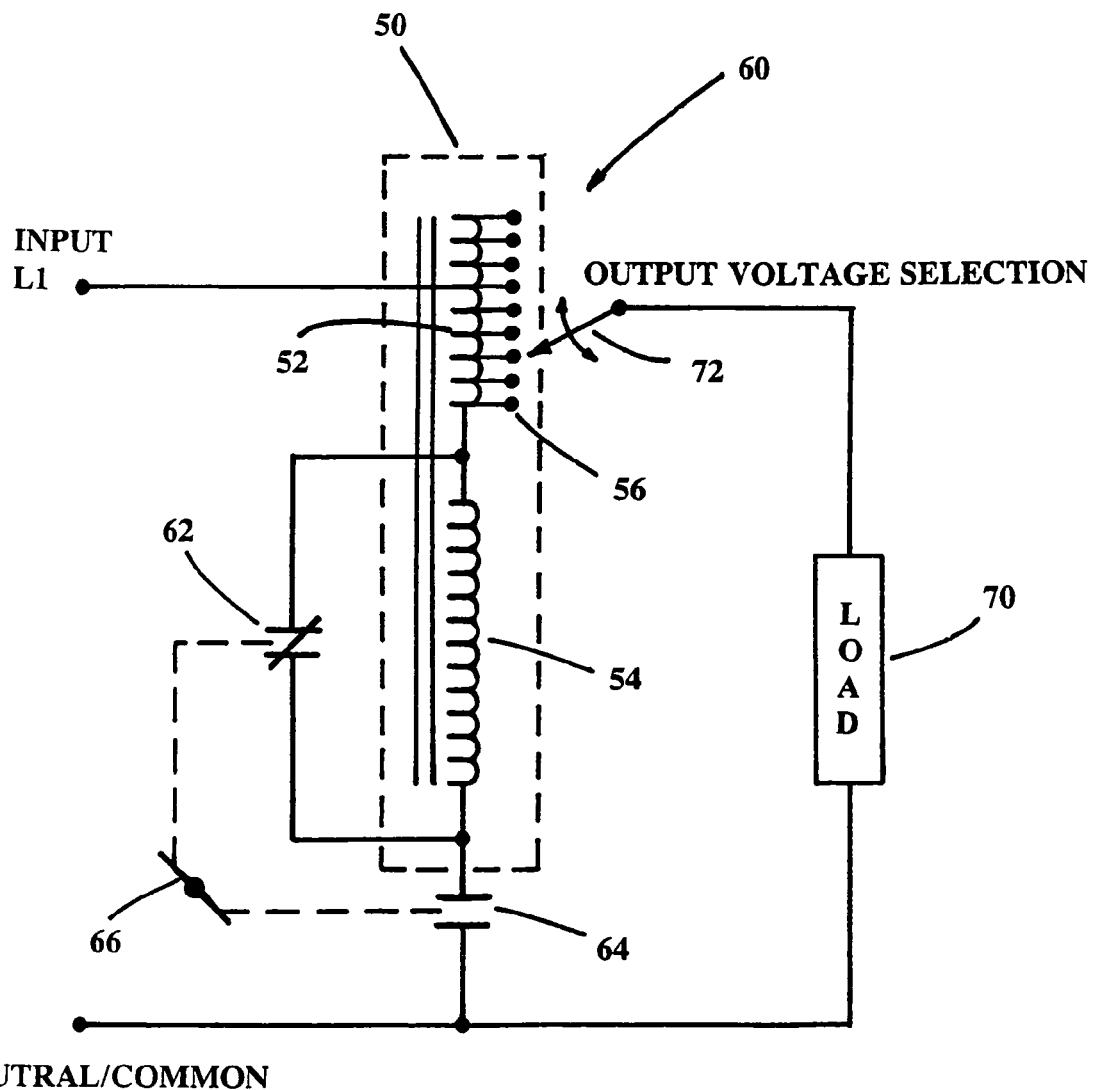
FIG. 3 illustrate the improved apparatus of the present invention shown configured in its nominal voltage mode for single-phase operation; shown configured in its nominal voltage mode.
Figure 4:
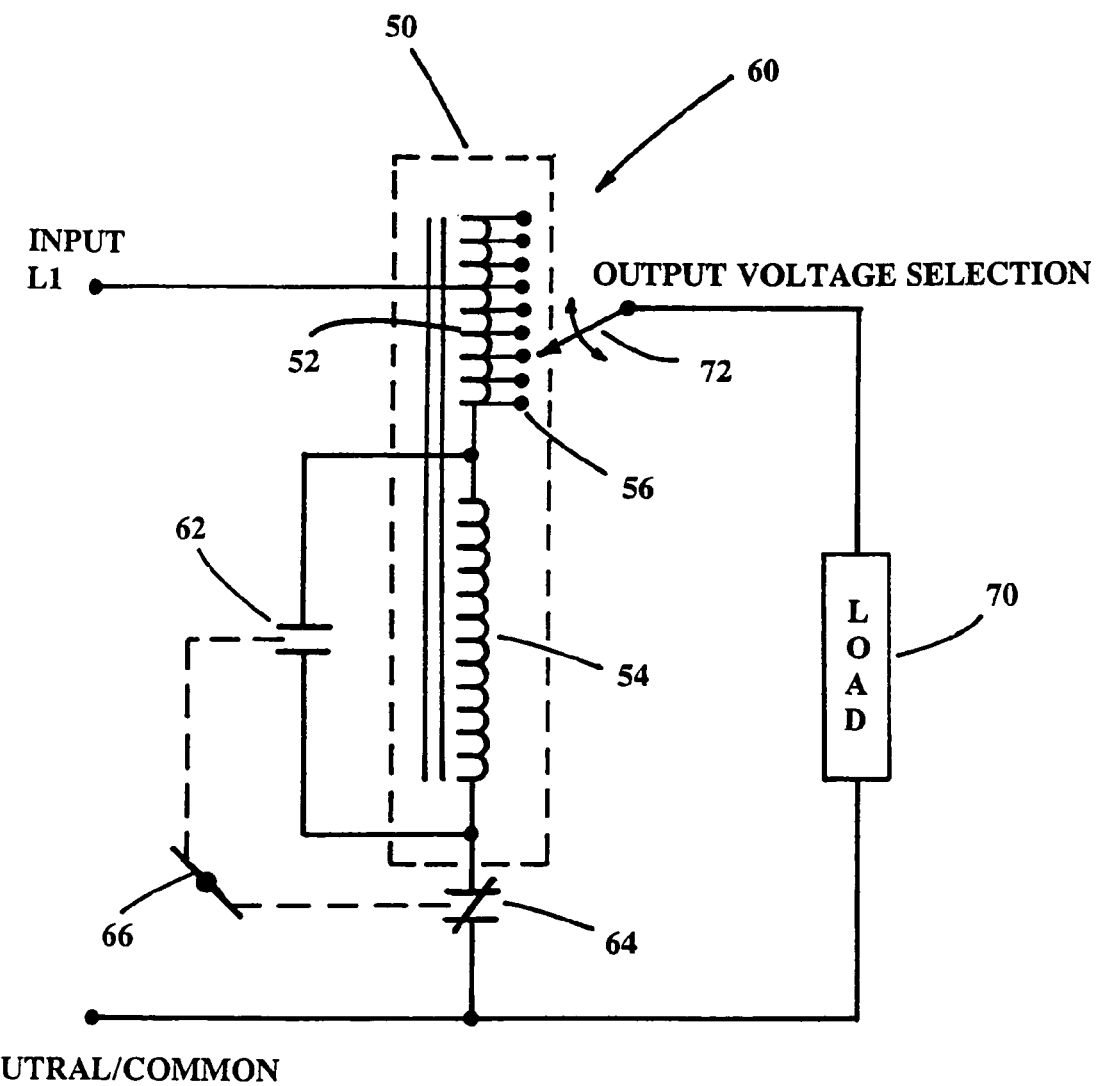
FIG. 4 illustrate the improved apparatus of the present invention shown configured in its step up/down voltage mode for single-phase operation; shown configured in its controlled voltage mode.
Figure 5:
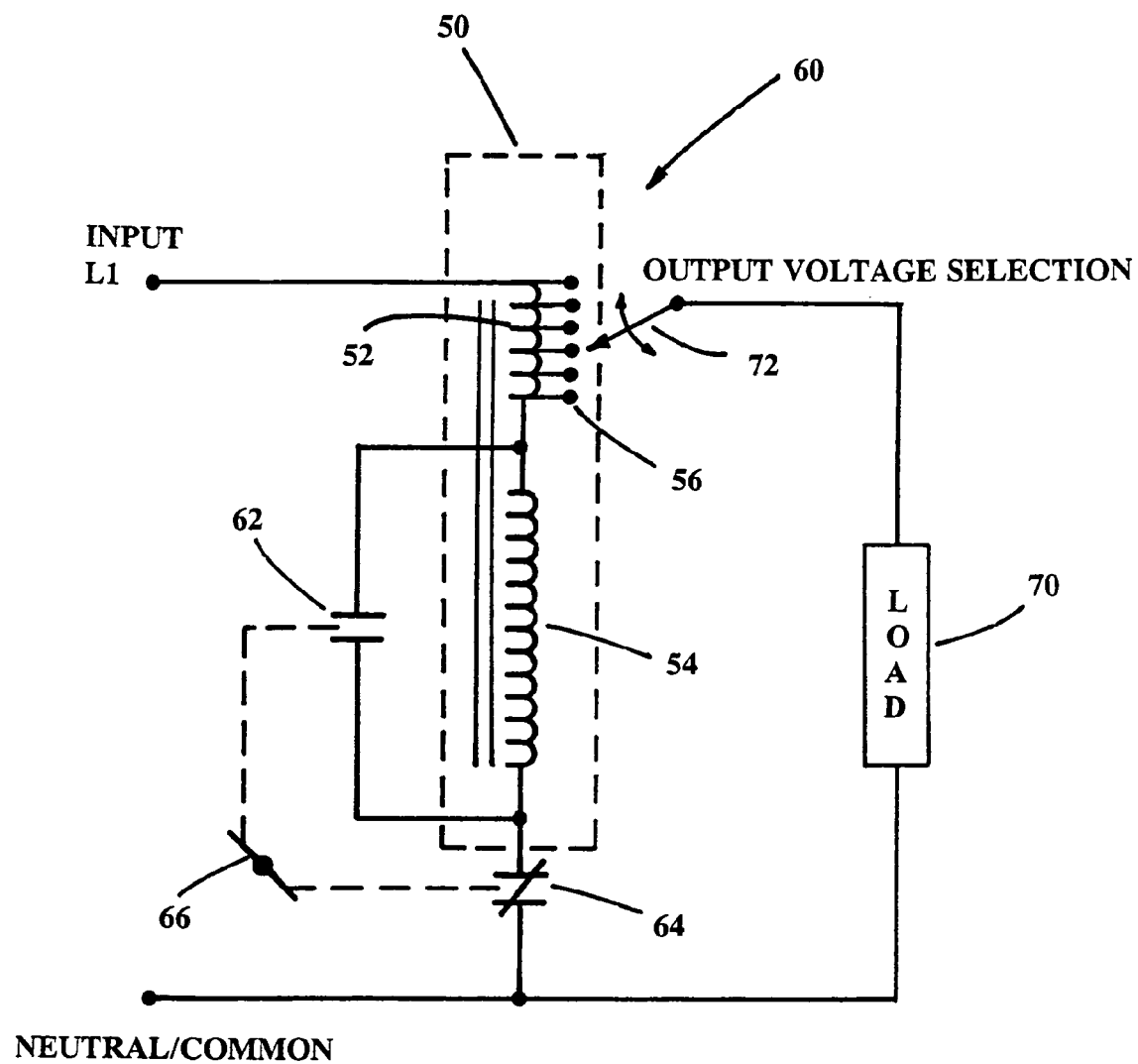
FIG. 5 illustrate the improved apparatus of the present invention shown configured in its step down or reduced voltage mode for single-phase operation; shown configured in its controlled voltage mode.

The improvement provided by the present invention to overcome this implementation problem may be understood best by referring to FIGS. 3 and 4. The FIGS. 3 and 4, illustrate the circuit of the present invention connected between an input and a load in a manner similar to the configuration shown in the circuit of FIGS. 1 and 2. FIG. 3 illustrates the same configuration in nominal voltage mode and FIG. 4 illustrates this configuration in a voltage step up/down mode. Thus, it will be seen that the improved voltage step up/down apparatus 60 of the present invention is as shown connected to a load 70, in order to deliver alternating current voltage thereto between an input and common or neutral of an alternating current power system in a manner similar to that of FIGS. 1 and 2. Also similar to FIGS. 1 and 2 the apparatus 60 contains of a series winding 52 and a common winding 54. Also provided therein is a contactor or other equivalent switching device 64, which is switched, to either connect or disconnect the common winding 54 to the common or neutral of an alternating current power system. However, unlike the circuit in FIGS. 1 and 2 this apparatus 60 employs a second contactor or other equivalent switching device 62 which is provided to short the common winding 54 for the nominal voltage mode operation. Both contactors, and other equivalent switching devices, are mechanically and electrically interlocked with the device 66 as shown in FIGS. 3, 4 and 5.

Also the present apparatus 60 in FIGS. 3 and 4 shows the use of a plurality of taps 56 for step up/down load voltage, connected at respective locations along the series winding 52, as well as a selection switch 72, which is electrically configured to permit the loads to be connected to any or more of the various series winding, taps 56 simultaneously. Switch 72 and series winding taps 56 are provided to enable the circuit of FIG. 4 to provide a plurality of selectable step up/down voltages to the load 70, the number and magnitude of such step up/down voltages being determined by the number of taps and the relative position of each tap along the series winding 52.

The taps 56 and the step up/down voltage selection switch 72 combined, to provide an optional advantage to the present invention but are not directed to the problem solving improvement described above, with regard to the related art circuit of FIGS. 1 and 2 and therefore need not be implemented in order to achieve the principle objects of the present invention defined herein above.

More specifically, although the circuit configuration of the present invention is substantially similar as to that disclosed in the aforementioned related art patents, in the preferred embodiment disclosed herein, the autotransformer contains of a series winding 52 and common winding 54 wound in the same relation and assembled on a magnetic steel core. This common winding 54 of the autotransformer 50 is shorted out with the contactor or other equivalent switching device 62 to oppose completely the magnetic field induced in the autotransformer core through the flowing load current in the series winding 52 during the nominal voltage mode. Consequently, despite the continuing high magnetic field and high frequency generated by the series winding of the autotransformer in the nominal voltage mode, any harmonics generated in the series winding, due to reduced number of turns of the autotransformer coil, are in effect, through shorting the common winding 54, compensated by the equal and opposite induced magnetic field in the autotransformer core. In fact, any high frequency magnetic field generated through the series winding in the nominal voltage mode operation of the circuits by the load current flow through the series winding, are exactly compensated by the equal and opposite effects generated through the shorting of the common winding.

As a result, no high frequency field is generated in the series winding, which consequently generate excessive amount of harmonics in the load current flowing in the series winding, which leads to over heating the autotransformer magnetic steel core and increases the copper and iron losses. The harmonics distortion of the voltage sine wave magnitude is eliminated to the point where the nominal voltage or virtually full input voltage can be achieved in the nominal voltage mode, thus enabling the necessary nominal voltage to be applied to the load or initiate the arc start of the Fluorescent lights or High Intensity Discharge lamps (HID) after initial turn on of the lamp fixture lights and other such lighting which especially conductive for use with the present invention. It will also be seen hereinafter that the implemented relays of the related art patent is replaced in the present invention by pair of contactors or equivalent switching devices, where can be interlocked mechanically and electrically.

These mechanically and electrically interlocked contactors serve the same function as the relays of the related art patent, namely to connect or disconnect the common winding from the series winding and the common or neutral terminal of an alternating current power system, depending on the mode of operation of the apparatus 60, namely shorting the common winding when it is desired to provide a full voltage mode for any applied load or start-up Fluorescent lights and/or High Intensity Discharge lamps (HID), for example opening the shorted autotransformer common winding and connecting the autotransformer common winding to the common or neutral terminal of an alternating current power system, the autotransformer performs its normal operation with the step up/down output voltage relative to the nominal input voltage in proportion to the ratio of impedance of the two windings of the autotransformer, when it is desired to provide a controlled voltage mode for any connected load or energy savings fixture.

However, in the configuration in which the common winding is disconnected from the common or neutral terminal of an alternating current power system, the aforementioned contactors of the present invention short the common winding at each end, while simultaneously disconnecting the common winding from the common or neutral terminal of an alternating current power system. Although this is a simple solution with no additional parallel winding wound in bifilar to the common autotransformer winding the aforementioned problems, it is also an elegant one, which essentially overcomes the disadvantage of the related art patent disclosure and enables one to achieve the important advantages described herein. Although the present invention has been described with respect to step up/down operation in a power system for any load, it is understood the present invention can also be utilized for only reduced or step down voltage to the load as described in FIG. 5.

It will be understood of course that the configuration shown in FIGS. 3, 4 and 5 may be utilized in alternative embodiments, including embodiments in which the load is connected in a line-to-line configuration as opposed to a line to common/neutral of the alternating current power system configuration shown therein.

It is also understood that the present invention can be utilized for multi phase (3 phase) power system. The present invention substantially improves the operation, efficiency and maintenance requirements of voltage step up/down circuits when compared to those described by the related art. By providing switching means for selectively short-circuiting, connecting and disconnecting the common winding 54, the present invention eliminates harmonics distortion generation and overheating arising during the nominal voltage activation mode. In normal operation mode, the switching provides for efficient operation of any load or high-density discharge lamp at reduced consumption levels.

Furthermore, it may be necessary to switch each such contactor at an instant in time when the corresponding sine wave of that phase is crossing zero in order to avoid arcing in the autotransformers or other detrimental effects. This switching may be achieved with solid-state relays or other solid-state devices. Thus it is now understood that what has been disclosed herein comprises an improved voltage step up/down apparatus 60 specifically designed to overcome implementation problems of a related art voltage reduction apparatus disclosed in U.S. Pat. No. 2,429,162, issued Oct. 14, 1947; U.S. Pat. No. 4,431,984, issued Feb. 14, 1984; U.S. Pat. No. 5,508,589, issued Apr. 16, 1996; U.S. Pat. No. 5,528,110, issued Jun. 18, 1996 and U.S. Pat. No. 5,623,186, issued Apr. 22, 1997. More specifically, the present invention is designed to overcome the problems associated with the part I related art of the magnetic field flux induced harmonic distortion and heating associated with the related art disclosure of the aforementioned patent which otherwise substantially detracted from the advantageous implementation thereof.

Furthermore, the present invention is designed also to overcome the significant disadvantage of the part II related art occurred during the relays switching operation from high voltage mode to reduced voltage mode and vice verse. The relays point of contact carry a doubled value of the induced voltage, caused through the bucking coil winding which wound in bifilar to the common autotransformer winding, so that the induced voltage in both winding have 180° out of phase relation and therefore peak to peak voltage value would be doubled, therefore the energy amount, to be vanished, would be quadruple since the relation-ship varies based on the square of the double quantity.

More specifically the present invention, also provides a highly advantageous apparatus 60 for controlling the output voltage to a load, which can be lower or higher than the nominal input voltage after initially providing a full magnitude of nominal voltage thereto by the use of an autotransformer having a series winding and common winding disconnect able and connectable to one another by means of contactors or equivalent switching devices. Thus, it is now understood that what has been disclosed herein comprises an improved voltage control apparatus 60 specifically designed to overcome implementation problems of a related arts voltage reduction apparatus disclosed in U.S. Pat. No. 2,429,162; U.S. Pat. No. 4,431,984; U.S. Pat. No. 5,508,589; U.S. Pat. No. 5,528,110 and U.S. Pat. No. 5,623,186.

More specifically, the present invention is designed to overcome the problem of magnetic field flux induced harmonic distortion and heating of the autotransformer core associated with the part I related art disclosure of the aforementioned patent and to overcome the disadvantage associated with the part II related art problem of opposite induced EMF in the parallel winding of the autotransformer in the nominal output voltage mode, which otherwise substantially detracted from the advantageous implementation thereof. More specifically, the present invention, also provides a highly advantageous apparatus 60 for controlling load voltage, which can be lower or higher than the nominal input voltage, after first providing a full magnitude of nominal voltage thereto by the use of an autotransformer having a series winding and common winding disconnect able and connectable to the common or neutral of alternating current of power system to one another by means of contactors or equivalent switching devices.

Those having skill in the art to which the present invention pertains, will now as a result of the applicant's teaching herein, perceive various modifications and additions which may be made to the invention. Accordingly, all such modifications and additions are deemed to be within the scope of the invention, which is to be limited, only by the claims appended hereto and their equivalents.

What is claimed is:

1. An apparatus for selectively stepping up/down the voltage applied from an input to any load in an alternating current power system; the apparatus comprising:
   a) an autotransformer having a series winding with a plurality taps for the selection of different output load voltages and a common winding
   b) the series winding being connected between said input of the alternating current power system and said common winding
   c) the common winding being connected between the series winding and common or neutral terminal of an alternating current power system
   d) the load is being connected between one tap of the series winding and the common or neutral terminal of the alternating current power system
   e) a pair of switching or solid state switching devices, the first switching device being connected between the autotransformer common winding and the common or neutral terminal of an alternating current power system, and one terminal of the second switching device is connected between the autotransformer series and common winding and the second terminal of the switching device is connected between the autotransformer common winding and the first switching device
   f) said pair of switching or solid state switching devices being configured for disconnecting said common winding of the autotransformer from the common or neutral terminal of an alternating current power system and shorting the common winding in a first position and opening the shorted common winding and connected said autotransformer common winding to the common or neutral terminal of an alternating current power system in a second position.

2. The apparatus recited in claim 1 wherein said series winding is wound in the same relation with the common winding.

3. The apparatus recited in claim 1 wherein said series and common winding have a turn ratio of approximately 1 to 4 of winding turns.

4. The apparatus recited in claim 1 wherein said pair of switching or solid state switching devices comprise respective a mechanical or/and electrical interlock for safety reasons.

5. The apparatus recited in claim 1 wherein said pair of switching devices is contactors or solid state switching devices.

6. The apparatus recited in claim 1 wherein said pair of switching or solid state switching devices comprises electrically actuatable.

7. The apparatus recited in claim 1 wherein said autotransformer design is standard.

8. The apparatus recited in claim 1 which further comprising a multiple pole switch or solid state switching devices interposed between said load and said series winding comprise a plurality of taps for selectively connecting said load to at least one of said plurality of taps for step up/down load voltage.

9. An apparatus having an autotransformer for selectively stepping up/down the voltage applied from an input to a load in an alternating current power system; the autotransformer comprising:

a series winding;
a common winding;
said windings being provided on a common magnetic steel core;
said series and common coil winding being respective wound in the same relation;
said apparatus further comprising a pair of contactors or solid state switching devices being configured for disconnecting said autotransformer common winding from the common or neutral terminal of an alternating current power system and shorting the common winding in the first position and opening the shorted common winding and connected said common winding to the common or neutral terminal of an alternating current power system in a second position.

10. The apparatus recited in claim 9 wherein load voltage changes up or down from nominal input voltage to a pre selected output voltage of any given percentage without switching the load current.

11. The apparatus recited in claim 9 wherein harmonics distortion in the series winding is prevented by flux compensation circuit method while operating in the nominal voltage mode.

12. The apparatus recited in claim 9 wherein the over all efficiency is increased.

13. The apparatus recited in claim 9 wherein the over all noise level is low.

14. The apparatus recited in claim 9 wherein changing the output voltage value for the load in changing the tap position on the series winding.

15. The apparatus recited in claim 9 wherein the autotransformer design circuit is standard.

* * * * *